United States Patent
Iyer et al.

(10) Patent No.: US 11,524,549 B2
(45) Date of Patent: Dec. 13, 2022

(54) OFF SET TRI-ZONE SLIDING TEMPERATURE DOOR STRATEGY

(71) Applicant: Hanon Systems, Daejeon (KR)

(72) Inventors: Jayanthi Iyer, Northville, MI (US);
Eric Haupt, Livonia, MI (US);
Michael Mungle, Brighton, MI (US);
Megan Stabile, New Hudson, MI (US)

(73) Assignee: HANON SYSTEMS, Daejeon (KR)

( * ) Notice: Subject to any disclaimer, the term of this patent is extended or adjusted under 35 U.S.C. 154(b) by 292 days.

(21) Appl. No.: 15/931,672

(22) Filed: May 14, 2020

(65) Prior Publication Data

US 2020/0384829 A1 Dec. 10, 2020

Related U.S. Application Data

(60) Provisional application No. 62/858,648, filed on Jun. 7, 2019.

(51) Int. Cl.
*B60H 1/00* (2006.01)

(52) U.S. Cl.
CPC ..... *B60H 1/00692* (2013.01); *B60H 1/00021* (2013.01); *B60H 1/00842* (2013.01)

(58) Field of Classification Search
CPC ............ B60H 1/00692; B60H 1/00021; B60H 1/00842; B60H 1/00064; B60H 2001/002; B60H 2001/00164
USPC ......................................................... 454/152
See application file for complete search history.

(56) References Cited

U.S. PATENT DOCUMENTS

| | | | | |
|---|---|---|---|---|
| 4,453,591 A | * | 6/1984 | Fehr | B60H 1/00842 236/44 R |
| 9,221,318 B2 | * | 12/2015 | Uemura | B60H 1/00849 |
| 10,017,027 B2 | * | 7/2018 | Haraguchi | B60H 1/00064 |
| 2005/0126774 A1 | | 6/2005 | Yamaguchi et al. | |
| 2007/0137833 A1 | * | 6/2007 | Kang | B60H 1/00692 165/42 |
| 2010/0304654 A1 | | 12/2010 | Kakizaki et al. | |
| 2018/0194192 A1 | | 7/2018 | Pierres et al. | |
| 2020/0307350 A1 | * | 10/2020 | Akiyama | B60H 1/00857 |

FOREIGN PATENT DOCUMENTS

| | | | |
|---|---|---|---|
| DE | 10345188 A1 * | 4/2004 | ......... B60H 1/00064 |
| EP | 17955387 A2 | 6/2007 | |
| WO | 2016008684 A1 | 1/2016 | |

* cited by examiner

*Primary Examiner* — Avinash A Savani
*Assistant Examiner* — Dana K Tighe
(74) *Attorney, Agent, or Firm* — Shumaker, Loop & Kendrick, LLP; James D. Miller

(57) ABSTRACT

An air-handling system for a motor vehicle includes a conditioning section having an evaporator core and a heater core. The conditioning section is separated into a primary zone and a secondary zone at a position disposed upstream of the heater core. The heater core extends partially into each of the primary zone and the secondary zone. A primary door assembly is disposed within the conditioning section at a position upstream of the heater core and a secondary door assembly is disposed within the secondary zone of the conditioning section at a position downstream of the primary door and upstream of the heater core.

18 Claims, 8 Drawing Sheets

OFF SET TRI-ZONE SLIDING TEMPERATURE DOOR STRATEGY

CROSS-REFERENCE TO RELATED APPLICATION

This patent application claims priority to U.S. Provisional Patent Application Ser. No. 62/858,648, filed on Jun. 7, 2019, the entire disclosure of which is hereby incorporated herein by reference.

FIELD OF THE INVENTION

The invention relates generally to a heating, ventilating, and air conditioning (HVAC) unit for a motor vehicle, and more particularly, to a HVAC unit for providing independent climate control to three different regions of a passenger compartment of the motor vehicle.

BACKGROUND

A vehicle typically includes a climate control system which maintains a temperature within a passenger compartment of the vehicle at a comfortable level by providing heating, cooling, and ventilating of the air supplied to the passenger compartment. Comfort is maintained in the passenger compartment by an integrated mechanism referred to in the art as a heating, ventilating, and air conditioning (HVAC) air-handling system. The air-handling system conditions air flowing therethrough and distributes the conditioned air throughout the passenger compartment.

The air-handling system commonly employs a casing having a plurality of conduits and doors for selectively controlling a flow of air to various vents within the passenger compartment of the vehicle, depending on an operating mode selected by a vehicle occupant. Each operating mode includes a preselected percentage of the air originating from a mixing chamber delivered to each of the corresponding vents associated with the selected operating mode. The vents may include panel vents, console vents, front floor vents, rear floor vents, windshield defrost vents, and side window defrost vents, for example.

It has become increasingly common for such air-handling systems to provide a feature wherein the passengers of the motor vehicle can select different temperature settings with respect to two or more different regions within the passenger compartment of the vehicle. For example, many vehicles include independent temperature control for the left and right sides of the passenger compartment, for the front and rear seat regions of the passenger compartment, or for combinations thereof, as desired.

However, the independent temperature control provided to the different zones of the passenger compartment presents many challenges. Specifically, the air-handling system should preferably control the temperature of the air passing therethrough with respect to each of the different zones of the passenger controller without requiring additional and independently provided heating or cooling devices within each of the independently provided flow paths leading to each of the different zones.

Accordingly, there exists a need in the art for an HVAC air-handling system configured to provide independent temperature control to two or more different zones of the passenger compartment of the associated motor vehicle without requiring additional heat exchanging structures to accomplish the different temperatures associated with the two or more different zones of the passenger compartment.

SUMMARY OF THE INVENTION

According to an embodiment of the present invention, an air-handling system for a motor vehicle comprises a conditioning section including an evaporator core and a heater core. The conditioning section is separated into a primary zone and a secondary zone at a position disposed downstream of the evaporator core and upstream of the heater core with respect to a flow of air passing through the conditioning section. The heater core extends partially into each of the primary zone and the secondary zone. A first primary door assembly is disposed within the conditioning section at a position upstream of the heater core and the first primary door assembly is configured to control a distribution of the flow of air entering the heater core within the primary zone. A secondary door assembly is disposed within the secondary zone of the conditioning section at a position downstream of the primary door assembly and upstream of the heater core and the secondary door assembly is configured to control a distribution of the flow of air entering the heater core within the secondary zone.

According to another embodiment of the present invention, an air-handling system for a motor vehicle comprises a conditioning section including an evaporator core and a heater core. The conditioning section is separated into a first primary zone, a second primary zone, and a secondary zone at a position disposed downstream of the evaporator core and upstream of the heater core with respect to a flow of air passing through the conditioning section. The heater core extends partially into each of the first primary zone, the second primary zone, and the secondary zone. A first primary door assembly is disposed within the conditioning section at a position upstream of the heater core. The first primary door assembly includes a first door and a second door. The first door is configured to control a distribution of the flow of air through the heater core with respect to the first primary zone and the second door is configured to control a distribution of the flow of air through the heater core with respect to the second primary zone. A secondary door assembly is disposed within the secondary zone of the conditioning section at a position downstream of the primary door assembly and upstream of the heater core. The secondary door assembly is configured to control a distribution of the flow of air entering the heater core within the secondary zone.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-12 illustrate an air-handling system of a heating, ventilating, and air conditioning (HVAC) system or climate control system for a vehicle (not shown) and the associated components thereof according to an embodiment of the present disclosure. The air-handling system typically provides heating, ventilating, and air conditioning for a passenger compartment (not shown) of the vehicle. The air-handling system generally includes an air-handling casing 10 defining various different flow paths and housing various different heat exchanging structures of the air-handling system.

Figure 1:
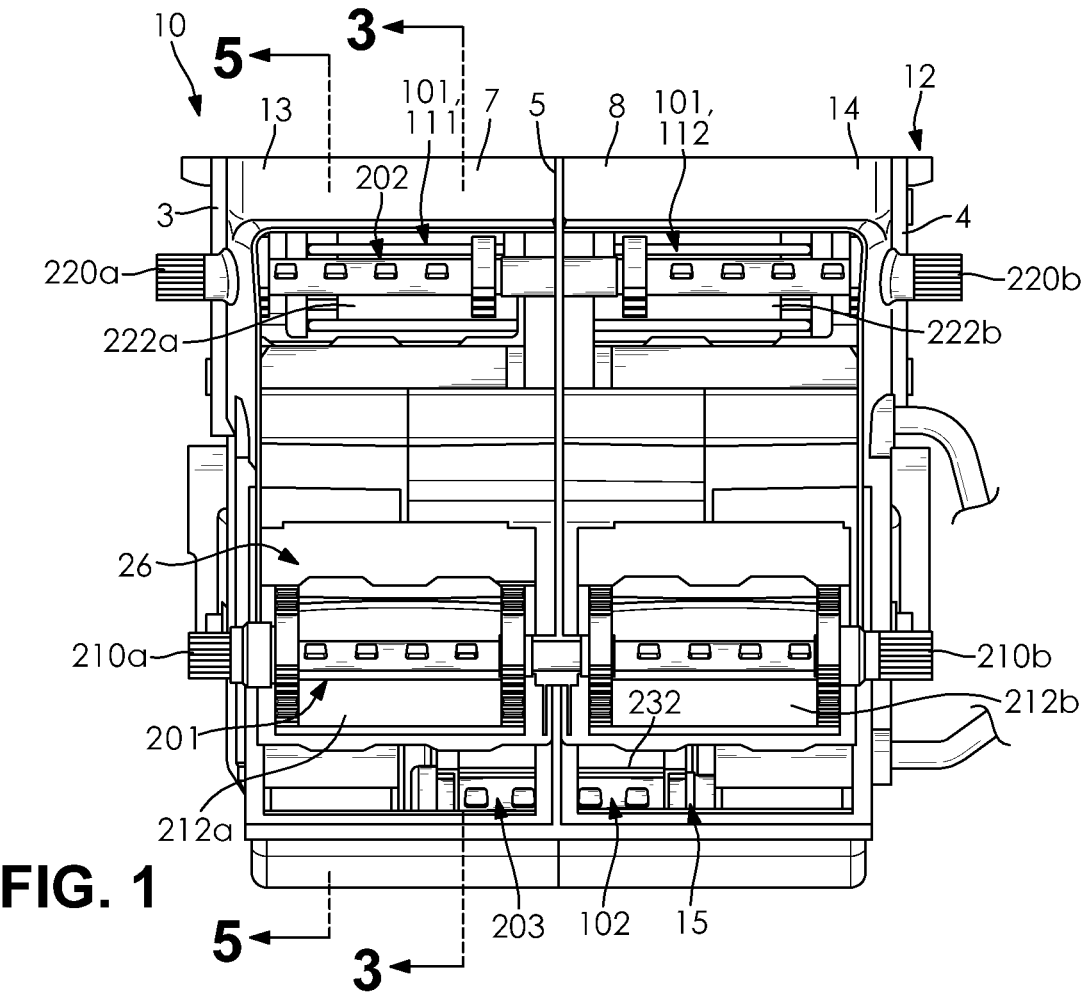
FIG. 1 is front elevational view of an air-handling system according to an embodiment of the present invention.
Figure 6:
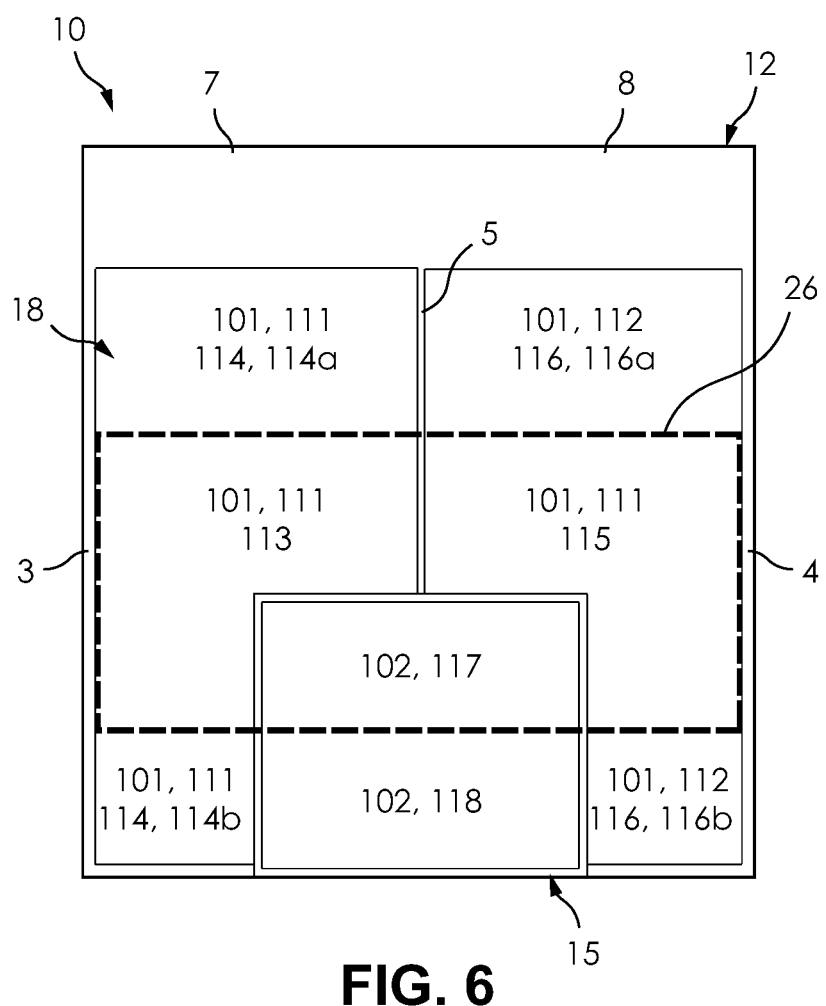
FIG. 6 is a schematic view of different zones defined by a conditioning section of the air-handling system of FIG. 1 with each of the zones associated with delivering air to a different region of a passenger compartment of a vehicle.
Figure 7:
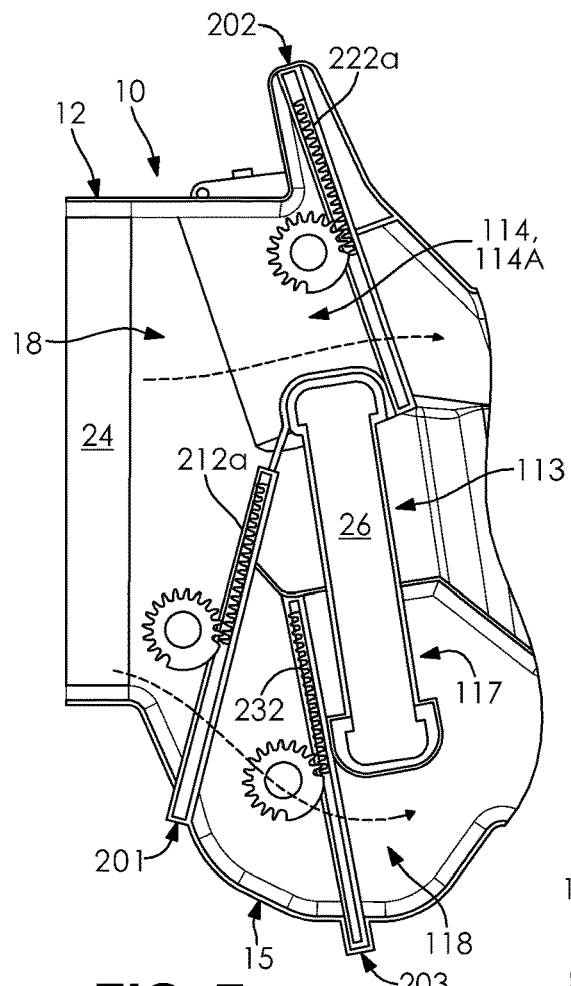
FIG. 7 is a fragmentary cross-sectional elevational view of the air-handling system of FIG. 1 showing a first primary zone operating in a cold temperature mode and a secondary zone operating in a cold temperature mode.
Figure 8:
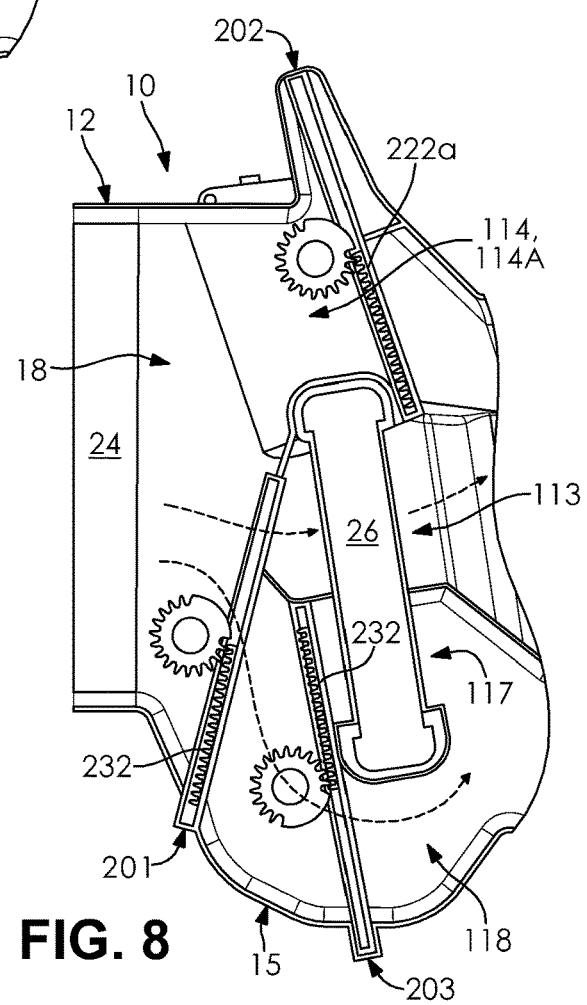
FIG. 8 is a fragmentary cross-sectional elevational view of the air-handling system of FIG. 1 showing a first primary zone operating in a warm temperature mode and a secondary zone operating in a cold temperature mode.
Figure 9:
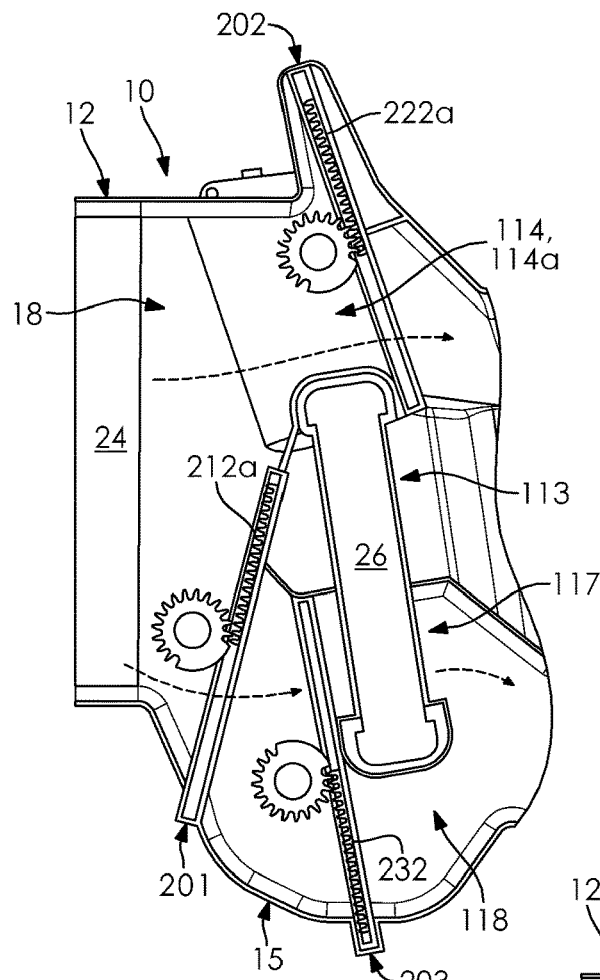
FIG. 9 is a fragmentary cross-sectional elevational view of the air-handling system of FIG. 1 showing a first primary zone operating in a cold temperature mode and a secondary zone operating in a warm temperature mode.
Figure 10:
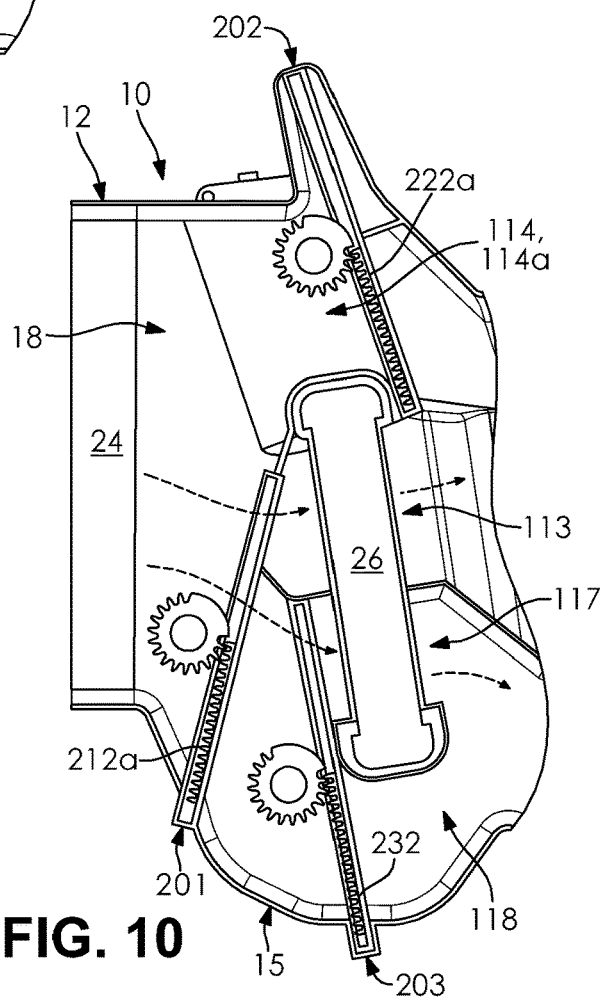
FIG. 10 is a fragmentary cross-sectional elevational view of the air-handling system of FIG. 1 showing a first primary zone operating in a warm temperature mode and a secondary zone operating in a warm temperature mode.
Figure 11:
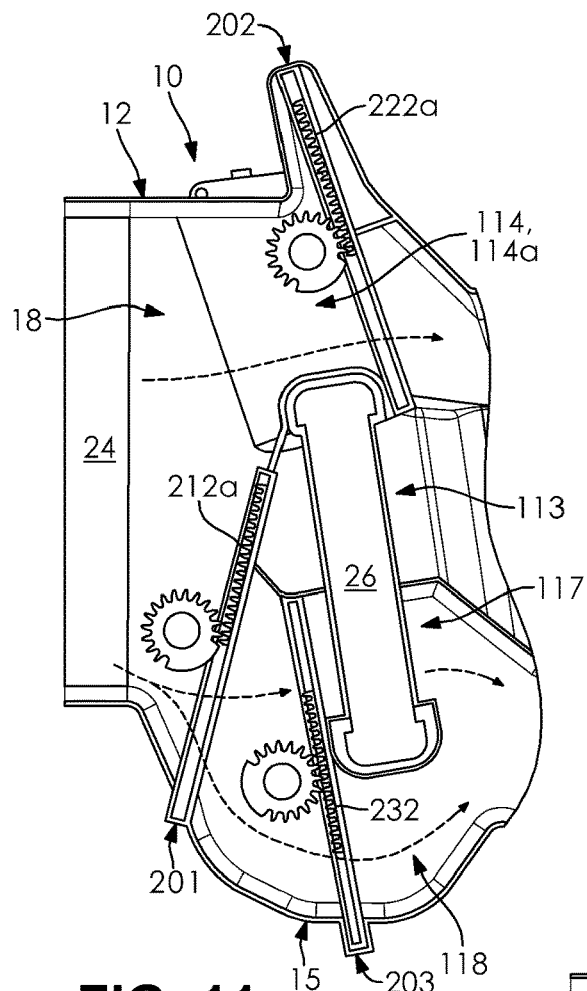
FIG. 11 is a fragmentary cross-sectional elevational view of the air-handling system of FIG. 1 showing a first primary zone operating in a cold temperature mode and a secondary zone operating in a mixed temperature mode.
Figure 12:
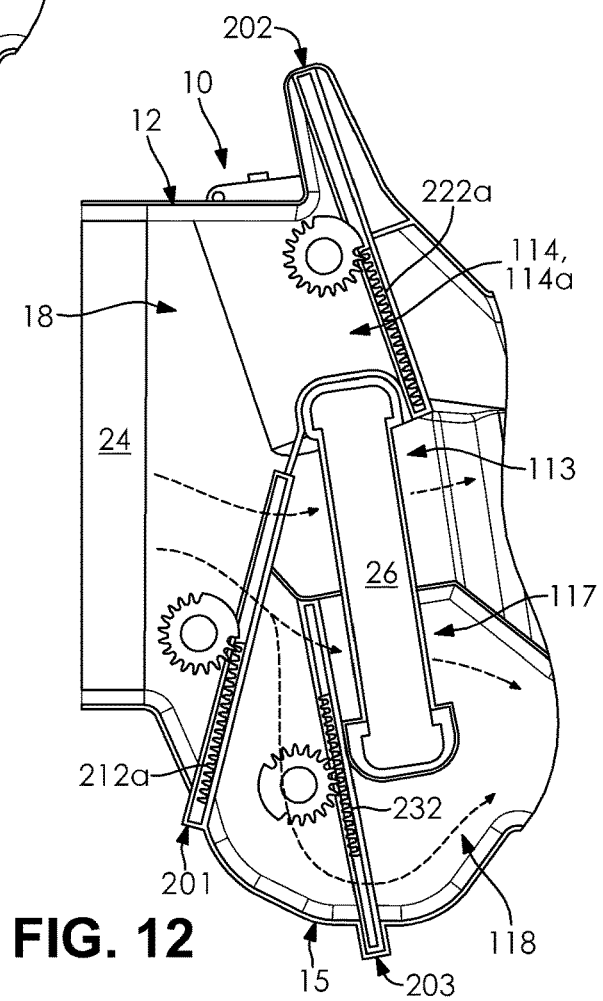
FIG. 12 is a fragmentary cross-sectional elevational view of the air-handling system of FIG. 1 showing a first primary zone operating in a warm temperature mode and a secondary zone operating in a mixed temperature mode.

The air-handling casing 10 includes a primary zone housing 12 and a secondary zone housing 15. The general configuration of the air-handling casing 10 is best illustrated in FIGS. 1 and 6, wherein FIG. 1 is an elevational view of the air-handling casing 10 from a position immediately downstream of an evaporator core 24 thereof while FIG. 6 is a schematic view illustrating a general configuration of the air-handling casing 10 from the perspective of a cross-section taken through a heater core 26 thereof.

The primary zone housing 12 may be formed by the cooperation of a first housing shell 13 and a second housing shell 14. The first and second housing shells 13, 14 may interface with each other along peripheral regions thereof to form opposing lateral side walls 3, 4 of the primary zone housing 12 as well as peripherally extending connecting walls 7, 8 of the primary zone housing 12 used to connect the opposing lateral side walls 3, 4, as desired. The peripheral regions of the first and second housing shells 13, 14 abut and engage each other along substantially the same dividing plane about a periphery of each of the first and second housing shells 13, 14.

The secondary zone housing 15 is disposed in a center of the air-handling casing 10 and includes a central plane arranged in lateral alignment with the dividing plane formed by the first and second housing shells 13, 14 to cause the secondary zone housing 15 to overlap with portions of each of the first housing shell 13 and the second housing shell 14 with respect to the lateral direction of the air-handling casing 10. The secondary zone housing 15 is further disposed along a bottom region of the primary zone housing 12 and includes a smaller width in the lateral direction than does the entirety of the primary zone housing 12 such that a portion of the first housing shell 13 extends along one lateral side of the secondary zone housing 15 while another portion of the second housing shell 14 extends along an opposing lateral side of the secondary zone housing 15.

Figure 3:
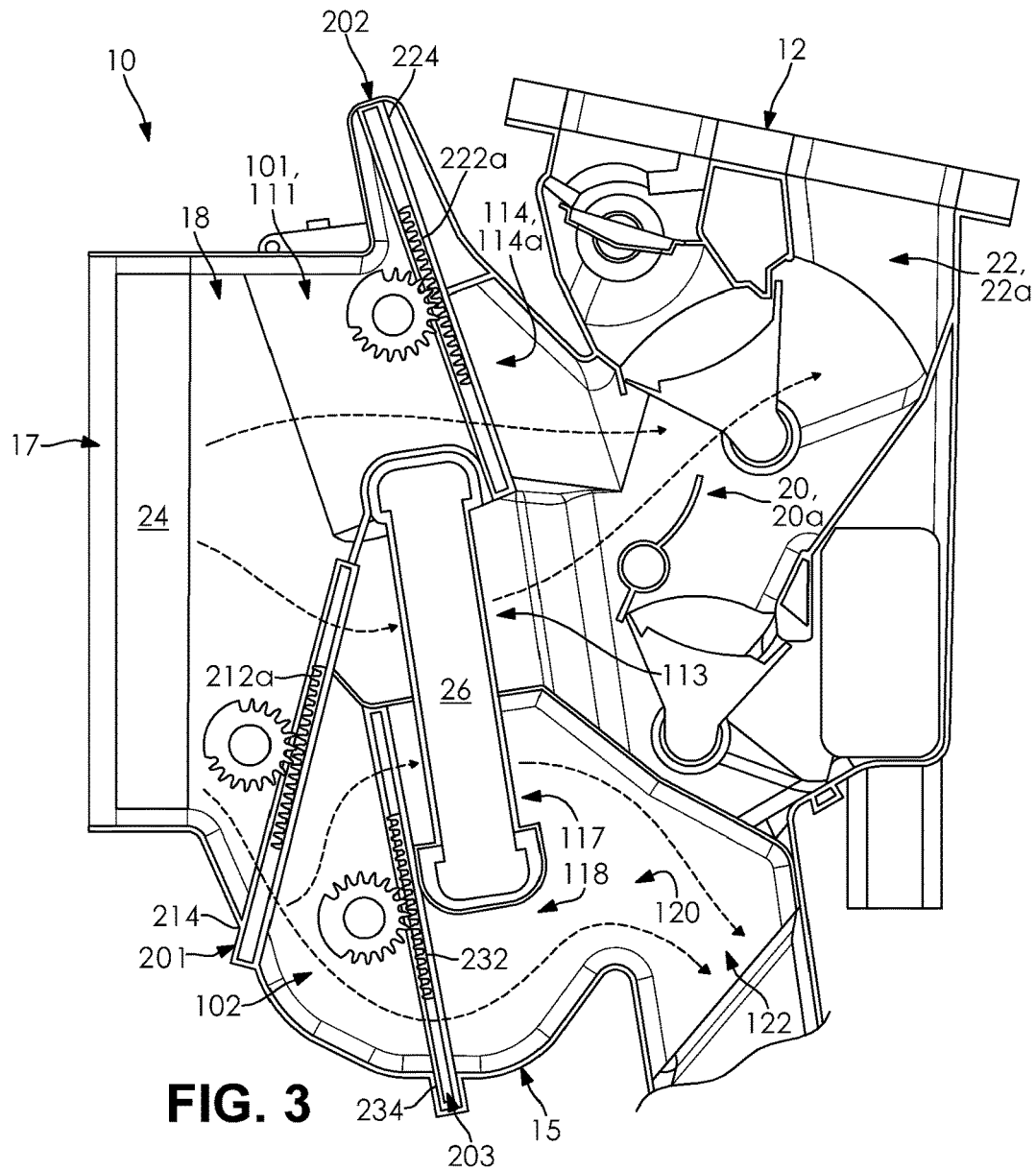
FIG. 3 is a cross-sectional elevational view of the air handling system of FIG. 1 as taken through section lines 3-3.
Figure 5:
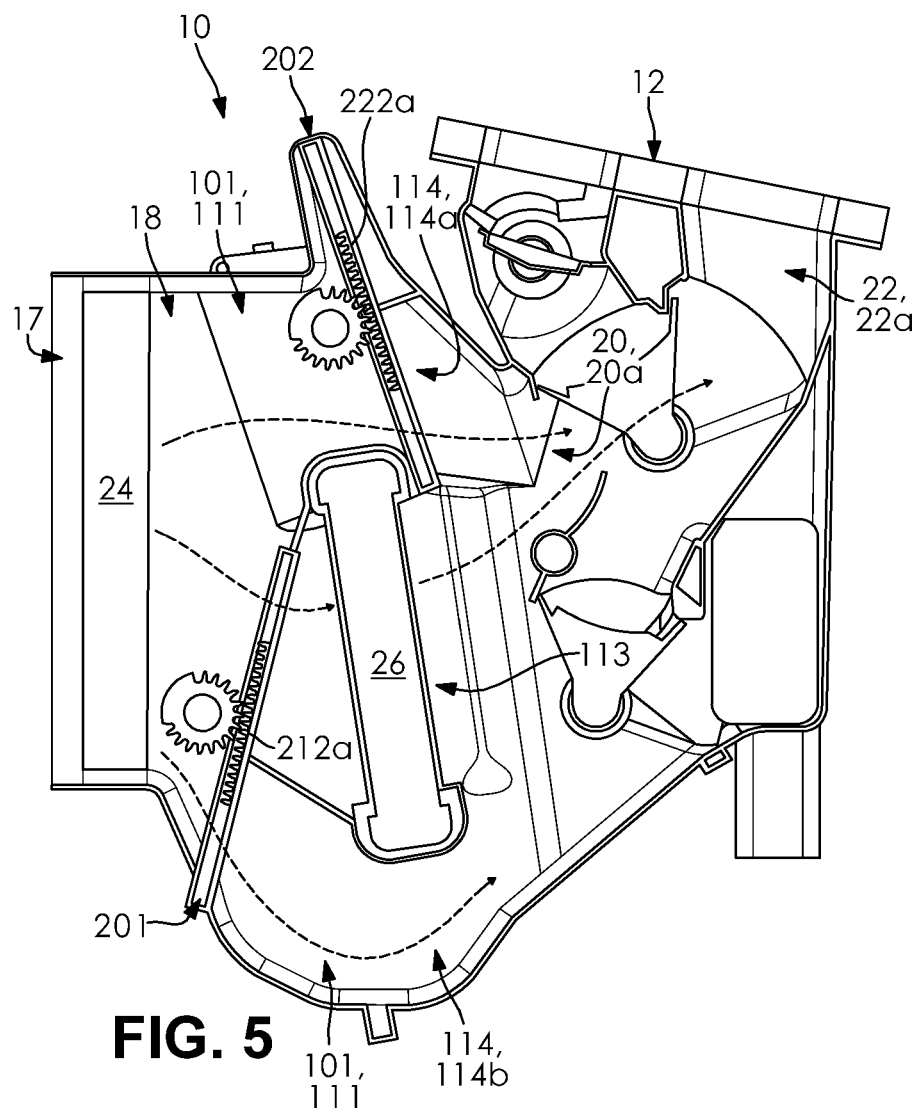
FIG. 5 is a cross-sectional elevational view of the air handling system of FIG. 1 as taken through section lines 5-5.

Referring now to FIGS. 3 and 5, the air-handling casing 10 includes an inlet section 17 and a conditioning section 18. The inlet section 17 receives a supply of air and may include a blower or fan (not shown) for causing the supply of the air to flow to the conditioning section 18. The supply of the air can be provided from outside of the vehicle, recirculated from the passenger compartment of the vehicle, or a mixture of the two, for example. If desired, a filter (not shown) can be provided upstream or downstream of the inlet section 17 to filter out debris or contaminants carried by the supply of air.

The conditioning section 18 includes the evaporator core 24 and the heater core 26. The evaporator core 24 and the heater core 26 may be in communication with a source of cooled fluid (not shown) and a source of heated fluid (not shown), respectively. The evaporator core 24 may form a portion of a primary refrigerant circuit of the air conditioning system associated with the air-handling system. The evaporator core 24 is configured to exchange heat energy between the air flowing through the air-handling casing 10 and a low temperature and low pressure refrigerant flowing through the evaporator core 24 in order to cool and/or dehumidify the air. Although described as an evaporator core 24, it should be understood that any form of cooling device in heat exchange relationship with any device or system of the motor vehicle may be employed for use with the air-handling casing 10 for selectively cooling the air without departing from the scope of the present invention.

The heater core 26 may form a radiator associated with a coolant circuit used to cool an engine of the motor vehicle. The heater core 26 is configured to exchange heat energy between the air flowing through the air-handling casing 10 and a coolant circulated through the coolant circuit in order to heat the air. Alternatively, the heater core 26 may be in heat exchange relationship with a fluid used to cool a battery or other heat producing device associated with the motor vehicle, or the heater core 26 may be a heating device such as a PTC heater configured to produce heat using an electrical source. In other embodiments, the heater core 26 may be a condenser/gas cooler forming a portion of the aforementioned primary refrigerant circuit of the air conditioning system exposed to a high temperature and high pressure portion of the refrigerant. The heater core 26 may also be provided as any combination of the aforementioned heating devices or heat exchanging structures arranged in series for selectively heating the air passing through the heater core 26 depending on a selected mode of operation or a heating requirement for conditioning the air in accordance with the desires of an occupant of the vehicle. It should be understood that any form of heating device or heat exchanging structure suitable for heating a flow of air therethrough may be used to form the heater core 26 without necessarily departing from the scope of the present invention.

The evaporator core 24 is disposed at a downstream end of the inlet section 17 and extends across an entirety of the flow cross-section of an upstream end of the conditioning section 18 to ensure that all air passing through the conditioning section 18 initially flows through the evaporator core 24. As illustrated schematically in FIG. 6, the heater core 26 extends laterally between the opposing lateral side walls 3, 4 of the air-handling casing 10, but does not occupy an entirety of the flow cross-section of the conditioning section 18 with respect to a height direction arranged substantially perpendicular to the lateral direction, thereby allowing for flow beneath or above the heater core 26 as described in greater detail hereinafter. At least one of the lateral side walls 3, 4 of the primary zone housing 12 may include an opening (not shown) having a cross-sectional shape corresponding to that of the heater core 26 to allow for installation of the heater core 26 into the primary zone housing 12 in the lateral direction thereof.

Figure 2:
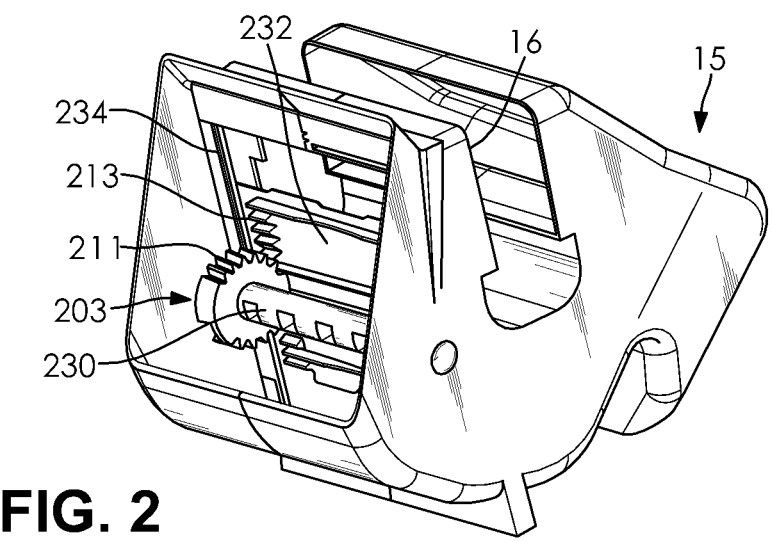
FIG. 2 is a perspective view of a secondary zone housing forming a portion of the air-handling system of FIG. 1.

As shown in FIG. 2, the secondary zone housing 15 includes an opening 16 formed therein to receive a portion of the heater core 26 within the secondary zone housing 15. The opening 16 is formed in an upper surface of the secondary zone housing 15 and extends along the lateral side surfaces thereof to allow for at least a portion of the heater core 26 to extend downwardly into the secondary zone housing 15. The configuration of the opening 16 also allows for the installation of the heater core 26 into the secondary zone housing 15 in the lateral direction of the air-handling casing 10 in similar fashion to the primary zone housing 12 as described hereinabove. As best shown in FIG. 3, the heater core 26 extends downwardly into the secondary zone housing 15 to cover about half of the flow cross-section through the secondary zone housing 15 while also extending out of the secondary zone housing 15 to cover about half of the flow cross-section through the portion of the primary zone housing 12 disposed immediately adjacent and above the secondary zone housing 15.

The conditioning section 18 includes a flow cross-section that is divided generally into a primary zone 101 and a secondary zone 102. The primary zone 101 is associated with delivering the conditioned air to the vents of the passenger compartment associated with a primary region of the passenger compartment, which may be generally representative of the front seat region of the vehicle, including directing the air towards the front passengers of the vehicle as well as the windshield and the side windows of the vehicle when a defrosting or defogging process is desired. The primary zone 101 may further include any vents associated with directing air towards the rear windshield of the vehicle via suitable ducts or conduits routed rearwardly through the vehicle, as desired. In contrast, the secondary zone 102 is associated with delivering the conditioned air to a secondary region of the passenger compartment, which may be representative of the rear seat region of the vehicle disposed rearwardly of the front seat region. The rear seat region may include any number of rows of seats depending on the configuration of the vehicle.

However, the primary zone 101 and the secondary zone 102 may each be associated with delivering the conditioned air to any different regions of the vehicle that are spaced apart from each other or otherwise associated with accomplishing different objectives in conditioning the passenger compartment of the vehicle without necessarily departing from the scope of the present invention. Generally, the different regions may be differentiated from each other by which vents of the passenger compartment are fluidly coupled with each of the different zones 101, 102 regardless of whether or not the different vents are directed to similar portions of the interior of the passenger compartment.

The secondary zone 102 may be defined entirely by an inner surface of the secondary zone housing 15 while the primary zone 101 may be defined by an inner surface of the primary zone housing 12 formed by the first and second housing shells 13, 14 as well as a portion of the outer surface of the second zone housing 15 disposed within the primary zone housing 12. However, one skilled in the art will appreciate that the same cross-sectional flow configuration may be achieved by utilizing a different arrangement of housing components, as desired, while remaining within the scope of the present invention.

The primary zone 101 of the present embodiment is further divided into a first primary zone 111 and a second primary zone 112 by a divider 5 of the primary zone housing 12. The divider 5 forms a wall of the main housing 12 arranged perpendicular to the lateral direction of the main housing 12 to separate the flow of air into the first primary zone 111 and the second primary zone 112 when the air flows through the conditioning section 18. The divider 5 may be provided on a plane disposed along a lateral center of the secondary zone housing 15 and may also be engaged by the peripheral regions of each of the opposing housing shells 13, 14 forming the opposing lateral halves of the primary zone housing 12, as desired. The divider 5 may accordingly begin the division of the air into the first primary zone 111 and the second primary zone 112 at a position downstream of the evaporator core 24 and upstream of the heater core 26 with respect to the direction of flow of the air exiting the evaporator core 24.

The primary zone housing 12 further defines a primary mixing section 20 and a primary delivery section 22 disposed downstream of the conditioning section 18 with respect to the flow through the primary zone 101. The primary mixing section 20 is associated with mixing the air immediately after being conditioned within the conditioning section 18 of the primary zone housing 12 while the primary delivery section 22 is associated with delivering the conditioned and mixed air to the various ducts and conduits leading to the different vents of the passenger compartment after being mixed within the primary mixing section 20.

In the present embodiment, the divider 5 continues through the air-handling casing 10 downstream of the conditioning section 18 thereof and into each of the primary mixing section 20 and the primary delivery section 22 to maintain the division of the air between the first primary zone 111 and the second primary zone 112 until the air is delivered to the passenger compartment of the vehicle through the various different vents associated with the air-handling casing 10. The primary mixing section 20 accordingly includes a first primary mixing section 20a (shown in FIGS. 3 and 5) as well as a second primary mixing section (not shown) as separated by the divider 5. The primary delivery section 22 similarly includes a first primary delivery section 22a (FIGS. 3 and 5) as well as a second primary delivery section (not shown) as separated by the divider 5.

As shown in FIG. 3, the secondary zone housing 15 defines a secondary mixing section 120 immediately downstream of the heater core 26 and a secondary delivery section 122 immediately downstream of the secondary mixing section 120. The air passing through the secondary zone housing 15 is mixed with in the secondary mixing section 120 before being distributed to the secondary region of the passenger compartment associated with the secondary delivery section 122.

The division of the air-handling casing 10 into the first primary zone 111, the second primary zone 112, and the secondary zone 102 accordingly leads to the air-handling casing 10 having the capability to deliver conditioned air to three different regions of the passenger compartment of the vehicle, wherein each of the different regions is associated with a different set of vents fluidly coupled to one of the disclosed delivery sections. For example, the vehicle may include a first set of vents associated with a front driver side of the passenger compartment with each of the first set of the vents fluidly coupled to the second primary delivery section, a second set of vents associated with a front passenger side of the passenger compartment with each of the second set of the vents fluidly coupled to the first primary delivery section 22a, and a third set of vents associated with a rear passenger region of the passenger compartment with each of the vents fluidly coupled to the secondary delivery section 122, as one non-limiting example.

The heater core 26 is positioned to extend across portions of each of the first primary zone 111, the second primary zone 112, and the secondary zone 102, as best shown in FIGS. 1 and 6. The positioning of the heater core 26 further divides each of the different zones 111, 112, 102 into a warm air path and a cool air path, wherein each of the warm air paths represents the portion of each zone 111, 112, 102 leading through the heater core 26 while each of the cool air paths represents the portion or portions of each of the zones 111, 112, 102 bypassing the heater core 26, even in the absence of a cooling effect being provided by the evaporator core 24, such as when an air conditioning setting of the HVAC system has not be selected by an occupant of the vehicle. In other words, references to the cool air paths and portions thereof as described hereinafter do not necessarily indicate that the low temperature and low pressure refrigerant is circulated through the evaporator core 24 prior to the air passing through each of the cool air paths and portions, but instead indicates only that the air is not caused to pass directly through any flow path including passage through the heater core 26.

The first primary zone 111 includes a warm air path 113 and a cool air path 114, the second primary zone 112 includes a warm air path 115 and a cool air path 116, and the secondary zone 102 includes a warm air path 117 and a cool air path 118. More specifically, the first primary zone 111 includes each of a first cool air path portion 114a disposed above the position of the heater core 26 and a second cool air path portion 114b disposed below the position of the heater core 26 while the second primary zone 112 includes each of a first cool air path portion 116a disposed above the position of the heater core 26 and a second cool air path portion 116b disposed below the position of the heater core 26. The division of the air-handling system 10 into the different described zones and paths may be best understood by a review of FIG. 6, which schematically illustrates how the different sections of the primary zone housing 12 and the secondary housing 15 are positioned relative to the heater core 26 (a boundary of which is shown in thick dashed lines) for causing air having exited the evaporator core 24 to flow through or to bypass the heater core 26 through each of the different paths and/or path portions identified herein. It is apparent from a review of FIG. 6 that the combined flow area through the cool air path portions 114a, 114b forming the cool air path 114 is substantially equal to the flow area through the warm air path 113 while the combined flow area through the cool air path portions 116a, 116b forming the cool air path 16 is substantially equal to the flow area through the warm air path 115. However, other distributions of the flow areas may be utilized without necessarily departing from the scope of the present invention, as desired, so long as the air-handling casing 10 is capable of delivering air to the passenger compartment while having the desired characteristics.

The illustrated embodiment of the air-handling casing 10 includes the portions of the primary zone housing 12 disposed below the heater core 26 and laterally to each side of the secondary zone housing 15 as forming the second cool air path portion 114b and the second cool air path portion 116b. This relationship is also disclosed in FIG. 5, which shows a cross-section through the first primary zone 111 (which is laterally offset from the secondary zone 102) to better illustrate how the air may be distributed between each of the warm air path 113, the first cool air path portion 114a, and the second cool air path portion 114b while flowing around or through the heater core 26. The same general configuration is also present within the second primary zone 112 having the cool air path portions 116a, 116b and the warm air path 115, hence further illustration thereof from a similar perspective to that shown in FIG. 5 is omitted.

The conditioning section 18 further includes a plurality of temperature control door assemblies for distributing the flow of the air through each of the different air paths 113, 114, 115, 116, 117, 118 described hereinabove for independently conditioning the air to be delivered to each of the different regions of the passenger compartment. The temperature control door assemblies include a first primary door assembly 201, a second primary door assembly 202, and a secondary door assembly 203.

Figure 4:
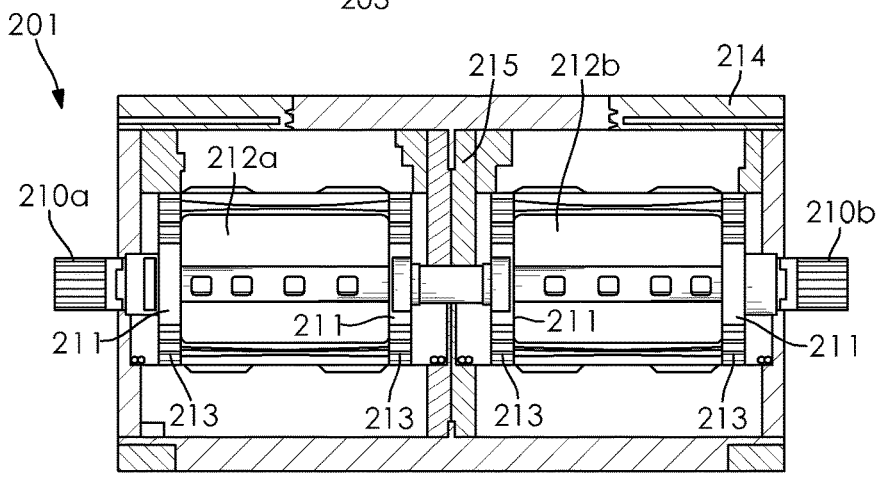
FIG. 4 is a front elevational view of a temperature control door assembly associated with distributing a flow of air through a cold air path and a warm air path of a primary zone of the air-handling system.

FIG. 4 illustrates the first primary door assembly 201 in isolation to better illustrate the different interacting structures thereof. The first primary door assembly 201 is provided as a sliding door assembly having a door structure configured to slide along a plane arranged transverse to a direction of flow of the air when passing through the conditioning section 18. The first primary door assembly 201 includes a frame member 214 forming a structure for slidably receiving a pair of door panels 212a, 212b therein and spaced laterally from each other, wherein the door panel 212a is associated with the first primary zone 111 and the door panel 212b is associated with the second primary zone 112. Each of the door panels 212a, 212b may alternatively be referred to simply as doors, as desired.

The frame member 214 extends around a periphery of the door panels 212a, 212b and further includes a dividing structure 215 provided in alignment with the divider 5 of the primary zone housing 12 for separating the flow to each of the primary zones 111, 112. The frame member 214 may be installed into the primary zone housing 12 or the frame member 214 may alternatively be formed by corresponding structure of the primary zone housing 12 without departing from the scope of the present invention. The lateral portions of the frame member 214 as well as the dividing structure 215 may include slots, rails, or similar structures for establishing the sliding relationship between each of the door panels 212a, 212b and the frame member 214 to allow for the door panels 212a, 212b to smoothly slide in the direction transverse to the general direction of flow of the air passing through the first primary door assembly 201.

Each of the door panels 212a, 212b is associated with a corresponding rotary shaft 210a, 210b. In the illustrated embodiment, each of the rotary shafts 210a, 210b share a common axis of rotation, but alternative configurations may be used without necessarily departing from the scope of the present invention. Each of the rotary shafts 210a, 210b includes a first engaging feature 211 and each of the door panels 212a, 212b includes a second engaging feature 213 configured to cooperate with the corresponding first engaging feature 211. In the illustrated embodiment, the first engaging feature 211 of each of the rotary shafts 210a, 210b includes a plurality of circumferentially spaced teeth projecting radially outwardly from an axis of rotation of the corresponding rotary shaft 210a, 210b to cause each of the first engaging features 211 to resemble the structure of a gear. The second engaging feature 213 of each of the door panels 212a, 212b is formed by a plurality of linearly spaced teeth projecting outwardly from each of the corresponding door panels 212a, 212b with the teeth spaced from each other in the direction of sliding of each of the door panels 212a, 212b. The teeth of each of the second engaging features 213 are spaced at intervals corresponding to the circumferential intervals between the teeth of the corresponding first engaging feature 211.

Rotation of the rotary shaft 210a accordingly causes a linear displacement of the door panel 212a along the plane defined thereby due to the rotary motion of the corresponding first engaging feature 211 being transferred linearly to the corresponding second engaging feature 213. Similarly, rotation of the rotary shaft 210b causes a corresponding linear displacement of the door panel 212b along the plane defined thereby. Rotation of either of the rotary shafts 210a, 210b in a first rotational direction causes the corresponding panel 212a, 212b to slide in a first sliding direction while rotation of either of the rotary shafts 210a, 210b in a second and opposite rotational direction causes the corresponding panel 212a, 212b to slide in a second sliding direction opposite the first sliding direction.

The second primary door assembly 202 includes substantially identical structure to that of the first primary door assembly 201, including the use of two door panels 222a, 222b slidably received within a frame structure 224 with one of the door panels 222a associated with the first primary zone 111 and the other of the door panels 222b associated with the second primary zone 112. Each of the door panels 222a, 222b is further associated with a corresponding rotary shaft 220a, 220b having the same cooperating structures 211, 213 for causing linear displacement of each of the respective door panels 222a, 222b, hence additional description is omitted. As best shown in FIG. 2, the secondary door assembly 203 also includes substantially identical structure to that of the primary door assemblies 201, 202, except the secondary door assembly 203 includes only a single door panel 232 slidably received within a frame structure 234 and extending laterally across the flow area of the secondary zone housing 15 from one lateral side thereof to the other lateral side thereof. The frame structure 234 may be integrated directly into the secondary zone housing 15 or may be a separate structure installed therein, as desired. The door panel 232 is also associated with a rotary shaft 230 having the same cooperating structures 211, 213 for causing the linear displacement of the door panel 232 as described with reference to the first primary door assembly 201.

Referring back to FIG. 1, each of the rotary shafts 210a, 210b, 220a, 220b may extend laterally outside of the air-handling casing 10 to allow for a suitable actuator (not shown) or component of an associated kinematics system (not shown) to operationally engage the rotary shafts 210a, 210b, 220a, 220b for causing the selective rotation of each of the rotary shafts 210a, 210b, 220a, 220b for prescribing the linear displacement of each of the corresponding door panels 212a, 212b, 222a, 222b.

In some embodiments, each of the rotary shafts 210a, 210b, 220a, 220b and hence each of the door panels 212a, 212b, 222a, 222b may be associated with an independently provided rotary actuator. However, it may be preferable to provide the rotary shafts 210a, 220a corresponding to the first primary zone 111 with a first actuator associated with a corresponding first kinematics system and the rotary shafts 220a, 220b corresponding to the second primary zone 112 with a second actuator associated with a second corresponding kinematics system to allow for independent control of the flow of air through each of the primary zones 111, 112 while eliminating the need for an independent actuator corresponding to each and every rotary shaft. For example, the first actuator may be caused to rotate the rotary shaft 210a and the first kinematics system may be a belt, gear arrangement, or similar mechanism configured to transfer the rotation of the rotary shaft 210a to the rotary shaft 220a in a prescribed manner, or vice versa. Similarly, the second actuator may be caused to rotate the rotary shaft 220a and the second kinematics system may be configured to transfer the rotation of the rotary shaft 220a to the rotary shaft 220b in a similarly prescribed manner, or vice versa. One skilled in the art should appreciate that a variety of different kinematic configurations may be used for causing the rotation of the rotary shafts 210a, 210b, 220a, 220b in a prescribed manner while remaining within the scope of the present invention.

The rotary shaft 230 associated with the door panel 232 may be operatively coupled to yet another independently provided actuator for sliding the door panel 232 independently from the remaining door panels 210a, 210b, 220a, 220b to allow for the control of the air through the secondary zone 102 regardless of the settings selected for the first and second primary zones 111, 112. This additional actuator may be disposed within the air-handling casing 10 along one of the lateral sides of the secondary zone housing 15 to avoid interruption of the flow through either of the primary zones 111, 112, as desired. However, the rotary shaft 230 may alternatively extend outside of the air-handling casing 10 for operatively engaging an externally provided actuator, as desired.

Each of the actuators described hereinabove may be a suitable electrically powered rotary motor in signal communication with a controller of the vehicle responsible for determining the degree of rotation of each of the rotary shafts 210a, 210b, 220a, 220b, 230 for placing the air-handling system in a desired mode of operation. For example, the passenger compartment of the vehicle may include one or more user interfaces responsible for setting the position of each of the rotary shafts 210a, 210b, 220a, 220b, 230, wherein the settings provided to the one or more user interfaces are communicated to the different actuators for prescribing the selected mode of operation.

In summary, the door panels 212a, 222a associated with the first primary zone 111 may be controlled by a first actuator and a first kinematics system, the door panels 212b, 222b associated with the second primary zone 112 may be controlled by a second actuator and a second kinematics system, and the door panel 232 associated with the secondary zone 102 may be controlled by a third actuator. This configuration allows for different occupants of the vehicle to select different settings for the air delivered to each of the different regions of the passenger compartment for air passing through a single air-handling casing 10 as disclosed herein.

FIG. 3 illustrates one mode of operation of the air-handling system showing the configuration of each of the first primary zone 111 and the secondary zone 102 while FIG. 5 illustrates the same mode of operation of the air-handling system showing the configuration of the first primary zone 111 exclusively to show how the different zones 111, 102 are configured to one side of the divider 5 during the commonly illustrated mode of operation. Additionally, FIGS. 7-12 illustrate the configuration of each of the first primary zone 111 and the secondary zone 102 from the same perspective shown in FIG. 3, except each of FIGS. 7-12 show different modes of operation of the air-handling system that are distinct from that shown in FIG. 3 in an attempt to fully show and describe the range of the modes of operation achievable utilizing the air-handling system of the present invention. As such, hereinafter only the first primary zone 111, the secondary zone 102, and combinations thereof are specifically shown and described when discussing the different modes of operation of the air-handling system as shown in each of FIGS. 3, 5, and 7-12. It should accordingly be understood that the configurations shown in the accompanying drawings may refer to the flow to only one side of the divider 5 if independent control is provided to each of the primary zones 111, 112 or may refer to the flow to both sides of the divider 5 if the primary zones 111, 112 are mechanically coupled to each other via common rotary shafts (such as rotary shafts 210a and 210b being provided as a single rotary shaft and rotary shafts 220a and 220b being provided as a single rotary shaft) or controlled simultaneously and identically via simultaneous and identical control of each of the associated door panels 212a, 212b, 222a, 222b, as desired. The first primary door assembly 201 and the second primary door assembly 202 are hereby described hereinafter with reference to only the door panels 212a, 222a associated with the first primary zone 111 for the sake of brevity and simplicity, and one skilled in the art should appreciate that the door panel 212b, 222b of each respective door assembly 201, 202 associated with the second primary zone 112 may be repositioned similarly to achieve each of the modes of operation disclosed hereinafter to the other side of the divider 5. It should further be apparent to one skilled in the art that the differing modes of operation selected with respect to either of the primary zones 111, 112 does not significantly alter the manner in which the secondary zone 102 is controlled for an independently selected mode of operation regarding the secondary zone 102.

First, the modes of operation capable of being achieved with respect to the first primary zone 111 are discussed hereinafter. As shown in FIGS. 3 and 5, the door panel 212a of the first primary door assembly 201 is configured to slide along a plane positioned to extend downstream of the evaporator core 24 and upstream of an inlet side of the heater core 26 to allow for the first primary door assembly 201 to control the distribution of the air between the second cool air path portion 114b and the warm air path 113 of the first primary zone 111. Specifically, the door panel 212a of the first primary door assembly 201 is positioned to slide between an upper end of inlet side of the heater core 26 and a lower wall of the primary zone housing 12 disposed immediately adjacent at an inlet into the secondary zone 102. The plane of the door panel 212a is also substantially parallel to and aligned with a plane formed by an inlet end of the secondary zone housing 15.

The door panel 212a is slidable between a first position (uppermost position) wherein the door panel 212a is disposed in front of the heater core 26 to block flow through the warm air path 113 while fully opening the second cool air path portion 114b and a second position (lowermost position) wherein the door panel 212a blocks the flow into the second cool air path portion 114b while fully opening the warm air path 113. In the provided illustration, the door panel 212a is positioned at one of a plurality of positions intermediate the first position and the second position wherein the door panel 212a partially blocks each of the warm air path 113 and the second cool air path portion 114b while still allowing for a distribution of the flow of air through each of the warm air path 113 and the second cool air path portion 114b with a reduced flow area therethrough. It should be apparent that continued motion of the door panel 212a upwardly towards the first position will progressively increase the flow area through the second cool air path portion 114b while also progressively decreasing the flow area through the warm air path 113 in order to control the distribution of the flow of air through each of the paths/path portions 113, 114b. Similarly, it should also be apparent that continued motion of the door panel 212a downwardly towards the second position will progressively increase the flow area through the warm air path 113 while also progressively decreasing the flow area through the second cool air path portion 114b. The door panel 212a is shown in the first position thereof in each of FIGS. 7, 9, and 11, and the door panel 212a is shown in the second position thereof in each of FIGS. 8, 10, and 12, although the second cool air path portion 114b is not illustrated in FIGS. 7-12 due to the lateral displacement of the perspective of FIGS. 7-12 from that shown in FIG. 5.

The door panel 222a of the second primary door assembly 202 is also configured to be positioned between a first position (uppermost position), a second position (lowermost position), and a plurality of intermediate positions between the first position and the second position. The door panel 222a is configured to slide along a plane extending between an upper surface of the primary zone housing 12 and a position adjacent and immediately downstream of an upper portion of the heater core 26 while controlling a distribution of the flow of air through the first cool air path portion 114a. The door panel 222a is shown in the first position thereof in each of FIGS. 7, 9, and 11, in the second position thereof in each of FIGS. 8, 10, and 12, and in one of the plurality of different intermediate positions in FIGS. 3 and 5. It should be apparent that the first position allows for a maximized distribution of the air to flow through the first cool air path portion 114a, the second position allows for a minimized distribution of the air to flow through the first cool air path portion 114a (essentially blocking flow through the first cool air path portion 114a), while the intermediate positions alter the distribution between the maximized and the minimized conditions. The door panel 222a of the second primary door assembly 202 accordingly cooperates with the door panel 212a of the first primary door assembly 201 to control a distribution of the flow of air allowed to bypass the heater core 26 within the first primary zone 111.

The door panel 212a of the first primary door assembly 201 and the door panel 222a of the second primary door assembly 202 each being placed in their respective first positions may be referred to as a cold setting or cool setting of the first primary zone 111 as a result of the heater core 26 being bypassed after the flow of air has exited the evaporator core 24. In contrast, the door panel 212a and the door panel 222a being placed in their respective second positions may be referred to as a warm setting of the first primary zone 111 due to a maximized distribution of the flow of air being passed through the heater core 26 after exiting the evaporator core 24. As mentioned above, a suitable kinematics system may be employed to cause the door panels 212a, 222a to be repositioned between the first positions thereof and the second positions thereof simultaneously to progressively cause more or less of the air to be distributed through the cold air path 114 and the warm air path 113, including any number of the plurality of intermediate positions described above. The intermediate positions of the door panels 212a, 222a may be referred to as mixed modes of operation of the first primary zone 111 due to the mixture of the air within the first primary mixing section 20a after exiting the warm air path 113 and the cold air path 114.

Now, the potential modes of operation of the secondary zone 102 are described. As is apparent from a review of each of FIGS. 3 and 7-12, the secondary zone 102 as defined by the interior of the secondary zone housing 15 is always in fluid communication with the air exiting the evaporator core 24 regardless of the position of the door panel 212a of the first primary door assembly 201, although the cross-sectional flow area into the secondary zone housing 15 may be maximized when the door panel 212a is placed in the first position for blocking the warm air path 113. As such, even when the occupants of the passenger compartment of the vehicle select different modes of operation with respect to each of the first primary zone 111 and the second primary zone 112, the secondary zone 102 still receives a portion of the flow of air from each side of the divider 5 forming the division between the laterally separated zones 111, 112. The air passing around the door panels 212a, 212b of the first primary door assembly 201 is therefore able to be enter the secondary zone housing 15 and hence the secondary zone 102 at different heights before being redistributed between the warm air path 117 and the cold air path 118 of the secondary zone 102 according to the setting selected for the secondary door assembly 203.

The door panel 232 of the secondary door assembly 203 is configured to slide within the secondary zone housing 15 (and hence the secondary zone 102 of the conditioning section 18) along a plane disposed at a position downstream of the plane of the first primary door assembly 201 and upstream of a plane defined by the heater core 26. The door panel 232 of the secondary door assembly 203 is configured to slide between a first position (uppermost position shown in FIGS. 7 and 8) blocking the flow through the warm air path 117 and a second position (lowermost position shown in FIGS. 9 and 10) blocking the flow through the cool air path 118. The first position of the door panel 232 accordingly allows for the heater core 26 to be bypassed while the second position allows for a maximized flow through the heater core 26. The door panel 232 of the secondary door assembly 203 is also able to be positioned at a plurality of intermediate positions (one example shown in each of FIGS. 3, 11, and 12) between the first position and the second position, as desired. The secondary door assembly 203 accordingly controls a distribution of the flow of the air through the warm air path 117 and the cold air path 118 of the secondary zone 102 based on a sliding position thereof within the secondary zone 102 of the conditioning section 18.

The air-handling system may also be adjustable to any possible configuration of the door assemblies 201, 202, 203 in addition to those shown and described herein for achieving any of a variety of different operational modes of the air-handling system.

The disclosed air-handling system accordingly allows for the independent temperature control of at least two spaced apart regions of the passenger compartment without requiring the use of additional heating or cooling devices or structures, and more specifically the illustrated configuration allows for independent temperature control of three different regions of the passenger compartment.

Figure 13:
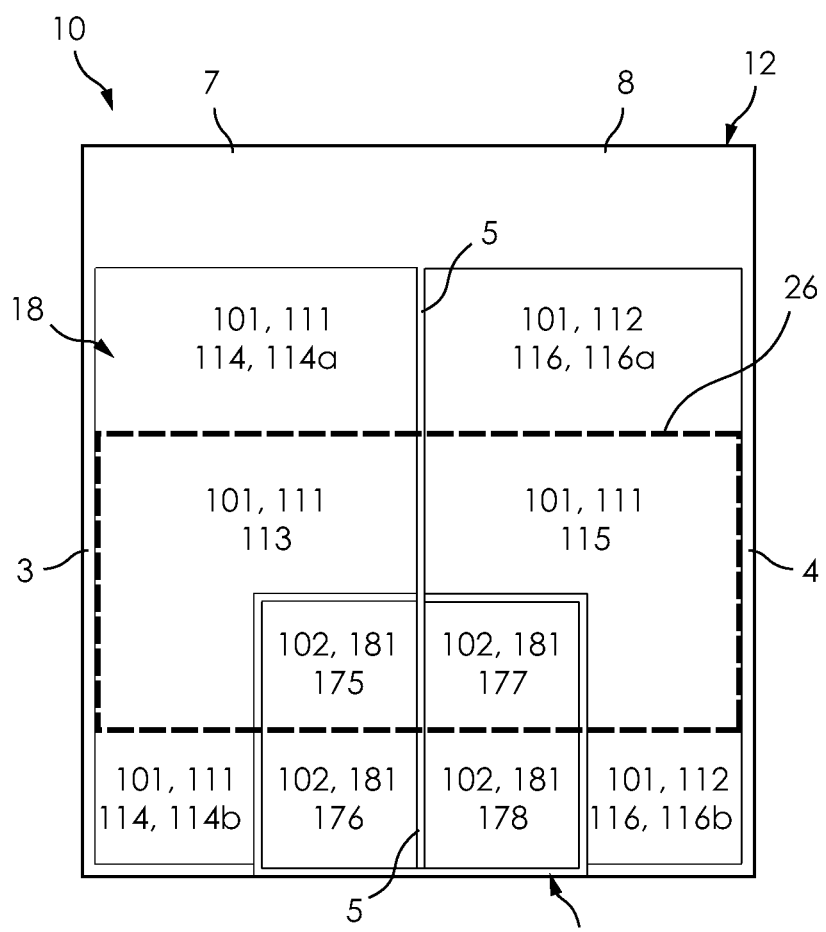
FIG. 13 is a schematic view of four different zones defined by a conditioning section of an air-handling system according to another embodiment of the invention with each of the four zones associated with delivering air to a different region of a passenger compartment of a vehicle.

It should also be apparent that the general configuration of the disclosed air-handling system may also be adapted for quad-zone control via the expansion of the various concepts of the invention as disclosed herein into the secondary zone housing 15 of the air-handling casing 10. For example, FIG. 13 schematically illustrates an additional embodiment of the invention wherein the divider 5 is extended downwardly through the secondary zone housing 15 to further divide the secondary zone 102 into a first secondary zone 181 to one side of the divider 5 and a second secondary zone 182 to the other side of the divider 5. The divider 5 may extend downstream of the position of the provided schematic illustration to continue to divide the flow of air through the secondary zone housing 15 with respect to independently provided and fluidly separated secondary mixing sections (not shown) and secondary delivery sections (not shown), wherein each of the secondary delivery sections is fluidly coupled to a different set of vents disposed within the rear seat region of the passenger compartment.

Although not pictured, the first secondary zone 181 and the second secondary zone 182 may be associated with independently provided door panels of the secondary door assembly 203 in similar fashion to the independently provided door panels 212a, 212b of the first primary door assembly 201. Each of the independently provided door panels of the secondary door assembly may extend laterally from one side surface of the secondary door housing 15 to the centrally disposed divider 5, but include a height in a direction perpendicular to the lateral direction that extends across only about half of the flow area through the secondary zone housing 15 at the position of the heater core 26. Furthermore, each of the independently provided door panels associated with the secondary door assembly 203 of the secondary zone 102 may be associated with an independently controlled rotary shaft and corresponding actuator for controlling a position of the corresponding door panel, wherein each of the actuators may be independently adjusted with respect to the driver side and the passenger side of the rear seat region, as one non-limiting example.

The extension of the divider 5 as described with reference to FIG. 13 accordingly allows for the first secondary zone 181 to be divided into a warm air path 175 through the heater core 26 and a cool air path 176 bypassing the heater core 26 while the second secondary zone 182 is similarly divided into a warm air path 177 through the heater core 26 and a cool air path 178 bypassing the heater core 26. Because each of the door panels 212a, 212b of the first primary door assembly 201 is configured to always allow for a partial flow of the air exiting the evaporator core 24 to always pass around the corresponding one of the door panels 212a, 212b and into the secondary zone 102 regardless of the instantaneous position thereof, each of the first secondary zone 181 and the second secondary zone 182 can always receive an independently provided partial flow of the air that can be controlled to flow through the heater core 26 or bypassed around the heater core 26 depending on the position of the corresponding one of the door panels of the secondary door assembly 203 formed to either side of the divider 5. Specifically, each of the separated and independently controlled door panels may be adjusted to any of the positions shown in FIGS. 3 and 7-12 (and additional intermediate positions from those specifically shown) for achieving any of a variety of cool air operating modes, warm air operating modes, or mixed air operating modes with respect to each of the first secondary zone 181 and the second secondary zone 182. Because each of FIGS. 3 and 7-12 are taken from a position to one side of the divider 5, each of the described modes of operation with respect to the quad-zone control would appear identically to those shown and described hereinabove except the illustrated secondary door assembly 203 would be representative of only one of the door panels as separated by the divider 5, hence the other of the door panels formed to the other side of the divider 5 would be free to be positioned differently from the illustrated configurations. As such, the flow of air exiting the evaporator core 24 may be divided and conditioned independently with respect to any of four different regions of the passenger compartment via use of the air-handling casing 10 configuration shown in FIG. 13.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air-handling system for a motor vehicle comprising:
a conditioning section including an evaporator core and a heater core, the conditioning section separated into a primary zone and a secondary zone at a position disposed downstream of the evaporator core and upstream of the heater core with respect to a flow of air passing through the conditioning section, the heater core extending partially into each of the primary zone and the secondary zone;
a first primary door assembly disposed within the conditioning section at a position upstream of the heater core with respect to the flow of air passing through the conditioning section, the first primary door assembly configured to control a distribution of the flow of air entering the heater core within the primary zone; and
a secondary door assembly disposed within the secondary zone of the conditioning section at a position downstream of the first primary door assembly and upstream of the heater core with respect to the flow of air passing through the conditioning section, the secondary door assembly configured to control a distribution of the flow of air entering the heater core within the secondary zone, wherein the primary zone is divided into a first primary zone and a second primary zone with respect to a lateral direction of the conditioning section arranged perpendicular to a direction of the flow of air passing through the conditioning section, wherein the first primary door assembly includes a first door configured to control a distribution of the flow of air through the heater core with respect to the first primary zone, and wherein the first primary door assembly includes a second door configured to control a distribution of the flow of air through the heater core with respect to the second primary zone.

2. The air-handling system of claim 1, wherein the first door of the first primary door assembly and the second door of the first primary door assembly are positionable independently of each other.

3. The air-handling system of claim 2, wherein the secondary door assembly includes a door that is positionable independently of the first door of the first primary door assembly and the second door of the first primary door assembly.

4. The air-handling system of claim 1, wherein the first primary door assembly always allows at least a portion of the flow of air to enter the secondary zone regardless of an instantaneous configuration of the first primary door assembly.

5. The air-handling system of claim 1, wherein each of the first primary door assembly and the secondary door assembly include at least one door panel configured to slide in a direction transverse to a direction the flow of air passes through the conditioning section.

6. The air-handling system of claim 5, wherein each of the door panels of the first primary door assembly and the secondary door assembly are operably engaged with a rotary shaft to cause a sliding of each of the door panels.

7. The air-handling system of claim 1, wherein the primary zone is defined by a primary zone housing and the secondary zone is defined by a secondary zone housing surrounded on at least three sides by the primary zone housing.

8. The air-handling system of claim 1, wherein the secondary zone includes a cool air path through which the flow of air bypasses the heater core and a warm air path through which the flow of air passes through the heater core.

9. An air-handling system for a motor vehicle comprising:
a conditioning section including an evaporator core and a heater core, the conditioning section separated into a primary zone and a secondary zone at a position disposed downstream of the evaporator core and upstream of the heater core with respect to a flow of air passing through the conditioning section, the heater core extending partially into each of the primary zone and the secondary zone;
a first primary door assembly disposed within the conditioning section at a position upstream of the heater core with respect to the flow of air passing through the conditioning section, the first primary door assembly configured to control a distribution of the flow of air entering the heater core within the primary zone; and
a secondary door assembly disposed within the secondary zone of the conditioning section at a position downstream of the first primary door assembly and upstream of the heater core with respect to the flow of air passing through the conditioning section, the secondary door assembly configured to control a distribution of the flow of air entering the heater core within the secondary zone, wherein the primary zone is divided into a first primary zone and a second primary zone with respect to a lateral direction of the conditioning section arranged perpendicular to a direction of the flow of air passing through the conditioning section, wherein the first primary zone includes a cool air path through which the flow of air bypasses the heater core and a warm air path through which the flow of air passes through the heater core, and wherein the second primary zone includes a cool air path through which the flow of air bypasses the heater core and a warm air path through which the flow of air passes through the heater core.

10. The air-handling system of claim 9, wherein the cool air path of the first primary zone is divided into a first cool air path portion disposed to a first side of the heater core with respect to a direction perpendicular to the lateral direction and a second cool air path portion disposed to an opposing second side of the heater core with respect to the direction perpendicular to the lateral direction, and wherein the cool air path of the second primary zone is divided into a first cool air path portion disposed to the first side of the heater core with respect to the direction perpendicular to the lateral direction and a second cool air path portion disposed to the opposing second side of the heater core with respect to the direction perpendicular to the lateral direction.

11. The air-handling system of claim 10, wherein the secondary zone is disposed between the second cool air path portion of the first primary zone and the second cool air path portion of the second primary zone with respect to the lateral direction of the conditioning section.

12. The air-handling system of claim 10, further comprising a second primary door assembly configured to control a distribution of the flow of air through each of the first cool air path portion of the first primary zone and the first cool air path portion of the second primary zone.

13. An air-handling system for a motor vehicle comprising:
  a conditioning section including an evaporator core and a heater core, the conditioning section separated into a primary zone and a secondary zone at a position disposed downstream of the evaporator core and upstream of the heater core with respect to a flow of air passing through the conditioning section, the heater core extending partially into each of the primary zone and the secondary zone;
  a first primary door assembly disposed within the conditioning section at a position upstream of the heater core with respect to the flow of air passing through the conditioning section, the first primary door assembly configured to control a distribution of the flow of air entering the heater core within the primary zone; and
  a secondary door assembly disposed within the secondary zone of the conditioning section at a position downstream of the first primary door assembly and upstream of the heater core with respect to the flow of air passing through the conditioning section, the secondary door assembly configured to control a distribution of the flow of air entering the heater core within the secondary zone, wherein the primary zone is divided into a first primary zone and a second primary zone with respect to a lateral direction of the conditioning section arranged perpendicular to a direction of the flow of air passing through the conditioning section, and wherein a divider forming a division between the first primary zone and the second primary zone is disposed on a plane extending through a center of the secondary zone with respect to the lateral direction of the conditioning section.

14. An air-handling system for a motor vehicle comprising:
  a conditioning section including an evaporator core and a heater core, the conditioning section separated into a primary zone and a secondary zone at a position disposed downstream of the evaporator core and upstream of the heater core with respect to a flow of air passing through the conditioning section, the heater core extending partially into each of the primary zone and the secondary zone;
  a first primary door assembly disposed within the conditioning section at a position upstream of the heater core with respect to the flow of air passing through the conditioning section, the first primary door assembly configured to control a distribution of the flow of air entering the heater core within the primary zone; and
  a secondary door assembly disposed within the secondary zone of the conditioning section at a position downstream of the first primary door assembly and upstream of the heater core with respect to the flow of air passing through the conditioning section, the secondary door assembly configured to control a distribution of the flow of air entering the heater core within the secondary zone, wherein the primary zone is divided into a first primary zone and a second primary zone with respect to a lateral direction of the conditioning section arranged perpendicular to a direction of the flow of air passing through the conditioning section, and wherein the first primary zone delivers the flow of air to a first portion of a front seat region of a passenger compartment, the second primary zone delivers the flow of air to a second portion of the front seat region of the passenger compartment, and the secondary zone delivers the flow of air to a rear seat region of the passenger compartment.

15. An air-handling system for a motor vehicle comprising:
  a conditioning section including an evaporator core and a heater core, the conditioning section separated into a primary zone and a secondary zone at a position disposed downstream of the evaporator core and upstream of the heater core with respect to a flow of air passing through the conditioning section, the heater core extending partially into each of the primary zone and the secondary zone;
  a first primary door assembly disposed within the conditioning section at a position upstream of the heater core with respect to the flow of air passing through the conditioning section, the first primary door assembly configured to control a distribution of the flow of air entering the heater core within the primary zone;
  a secondary door assembly disposed within the secondary zone of the conditioning section at a position downstream of the first primary door assembly and upstream of the heater core with respect to the flow of air passing through the conditioning section, the secondary door assembly configured to control a distribution of the flow of air entering the heater core within the secondary zone; and
  a second primary door assembly configured to cooperate with the first primary door assembly to control a distribution of the air bypassing the heater core.

16. An air-handling system for a motor vehicle comprising:
  a conditioning section including an evaporator core and a heater core, the conditioning section separated into a first primary zone, a second primary zone, and a secondary zone at a position disposed downstream of the evaporator core and upstream of the heater core with respect to a flow of air passing through the conditioning section, the heater core extending partially into each of the first primary zone, the second primary zone, and the secondary zone;
  a first primary door assembly disposed within the conditioning section at a position upstream of the heater core with respect to the flow of air passing through the conditioning section, the first primary door assembly including a first door and a second door, the first door configured to control a distribution of the flow of air through the heater core with respect to the first primary zone and the second door configured to control a distribution of the flow of air through the heater core with respect to the second primary zone; and
  a secondary door assembly disposed within the secondary zone of the conditioning section at a position downstream of the primary door assembly and upstream of the heater core with respect to the flow of air passing through the conditioning section, the secondary door assembly configured to control a distribution of the flow of air entering the heater core within the secondary zone.

17. The air-handling system of claim 16, wherein the first primary zone includes a cool air path through which the flow of air bypasses the heater core and a warm air path through which the flow of air passes through the heater core, the second primary zone includes a cool air path through which the flow of air bypasses the heater core and a warm air path through which the flow of air passes through the heater core, and the secondary zone includes a cool air path through which the flow of air bypasses the heater core and a warm air path through which the flow of air passes through the heater core.

18. The air handling system of claim 16, further comprising a second primary door assembly including a first door and a second door, the first door of the first primary door assembly configured to cooperate with the first door of the second primary door assembly to control a distribution of the flow of air through the heater core with respect to the first primary zone, and the second door of the first primary door assembly configured to cooperate with the second door of the second primary door assembly to control a distribution of the flow of air through the heater core with respect to the second primary zone.

* * * * *